US010667014B2

(12) United States Patent
Shaw et al.

(10) Patent No.: US 10,667,014 B2
(45) Date of Patent: May 26, 2020

(54) TRIGGERING AN ACTION IN A COMPUTER DEVICE

(71) Applicant: PIKSEL, INC., Wilmington, DE (US)

(72) Inventors: Philip Antony Shaw, York (GB); Miles Eusebius Weaver, London (GB); Issar Amit Kanigsberg, Mill Valley, CA (US)

(73) Assignee: PIKSEL, INC., Wilmington, DE (US)

( * ) Notice: Subject to any disclaimer, the term of this patent is extended or adjusted under 35 U.S.C. 154(b) by 351 days.

(21) Appl. No.: 15/021,639

(22) PCT Filed: Sep. 11, 2014

(86) PCT No.: PCT/EP2014/069458
§ 371 (c)(1),
(2) Date: Mar. 11, 2016

(87) PCT Pub. No.: WO2015/036517
PCT Pub. Date: Mar. 19, 2015

(65) Prior Publication Data
US 2016/0227266 A1 Aug. 4, 2016

(30) Foreign Application Priority Data
Sep. 11, 2013 (GB) .................................. 1316196.3

(51) Int. Cl.
*H04N 21/482* (2011.01)
*H04N 21/258* (2011.01)
(Continued)

(52) U.S. Cl.
CPC ......... *H04N 21/4826* (2013.01); *H04L 51/02* (2013.01); *H04L 51/32* (2013.01);
(Continued)

(58) Field of Classification Search
CPC ............ H04N 21/4826; H04N 21/251; H04N 21/25891; H04N 21/26258;
(Continued)

(56) References Cited

U.S. PATENT DOCUMENTS

2003/0018973 A1* 1/2003 Thompson ............. H04H 60/40
725/47
2006/0064700 A1* 3/2006 Ludvig .................. H04N 5/445
719/318
(Continued)

FOREIGN PATENT DOCUMENTS

EP 2469843 A1 11/2007
EP 2475267 A1 7/2012

OTHER PUBLICATIONS

EP14777019.2 Examination Report, European Patent Office, dated Nov. 3, 2017.
(Continued)

*Primary Examiner* — Pinkal R Chokshi
(74) *Attorney, Agent, or Firm* — Holzer Patel Drennan

(57) ABSTRACT

A computer-implemented method of triggering an action based on behaviour of a user consuming content at a user device, the method comprising receiving content change signals at a processor executing a content change detection algorithm, wherein the content change signals denote a change of content on the user device; wherein the detection algorithm compares the content change signals with a content change behaviour associated with that device to detect a surfing condition and generates a triggering control signal for triggering an action when the surfing condition for that device is detected.

20 Claims, 5 Drawing Sheets

(51) Int. Cl.
| | |
|---|---|
| *H04N 21/438* | (2011.01) |
| *H04N 21/262* | (2011.01) |
| *H04N 21/25* | (2011.01) |
| *H04N 21/472* | (2011.01) |
| *H04N 21/658* | (2011.01) |
| *H04L 12/58* | (2006.01) |
| *H04N 21/442* | (2011.01) |
| *H04N 21/45* | (2011.01) |
| *H04N 21/466* | (2011.01) |
| *H04N 21/2668* | (2011.01) |
| *H04N 21/6543* | (2011.01) |
| *H04N 21/81* | (2011.01) |
| *H04N 21/488* | (2011.01) |
| *H04N 21/84* | (2011.01) |
| *H04N 21/2665* | (2011.01) |
| *H04N 21/422* | (2011.01) |

(52) U.S. Cl.
CPC ..... *H04N 21/251* (2013.01); *H04N 21/25866* (2013.01); *H04N 21/25891* (2013.01); *H04N 21/2668* (2013.01); *H04N 21/26258* (2013.01); *H04N 21/4383* (2013.01); *H04N 21/4384* (2013.01); *H04N 21/44204* (2013.01); *H04N 21/44218* (2013.01); *H04N 21/4532* (2013.01); *H04N 21/4667* (2013.01); *H04N 21/4668* (2013.01); *H04N 21/472* (2013.01); *H04N 21/4882* (2013.01); *H04N 21/6543* (2013.01); *H04N 21/6582* (2013.01); *H04N 21/812* (2013.01); *H04N 21/84* (2013.01); *H04N 21/25825* (2013.01); *H04N 21/25833* (2013.01); *H04N 21/25841* (2013.01); *H04N 21/2665* (2013.01); *H04N 21/42202* (2013.01)

(58) Field of Classification Search
CPC ........... H04N 21/2668; H04N 21/4383; H04N 21/4384; H04N 21/4532
See application file for complete search history.

(56) References Cited

U.S. PATENT DOCUMENTS

| | | | |
|---|---|---|---|
| 2007/0026828 A1 | 2/2007 | Goto | |
| 2007/0169148 A1* | 7/2007 | Oddo | H04N 5/44543 725/46 |
| 2007/0265857 A1 | 11/2007 | Rao | |
| 2007/0277218 A1 | 11/2007 | Borden | |
| 2011/0093337 A1* | 4/2011 | Granit | G06Q 30/0251 705/14.53 |
| 2011/0173663 A1 | 7/2011 | Boudalier | |
| 2012/0180090 A1* | 7/2012 | Yoon | H04N 5/445 725/45 |
| 2012/0324499 A1* | 12/2012 | Deng | H04H 60/33 725/18 |
| 2013/0081084 A1* | 3/2013 | Scheer | H04N 21/2408 725/46 |
| 2013/0167168 A1* | 6/2013 | Ellis | H04N 5/44543 725/12 |
| 2014/0078252 A1* | 3/2014 | Kato | H04N 13/128 348/43 |
| 2014/0109125 A1* | 4/2014 | Kim | H04N 21/482 725/14 |
| 2014/0282714 A1* | 9/2014 | Hussain | H04N 21/4263 725/34 |
| 2015/0037011 A1* | 2/2015 | Hubner | H04N 5/76 386/264 |

OTHER PUBLICATIONS

Summons to Oral Proceedings, European Patent Office, for corresponding EP application 14777019.2, dated Feb. 12, 2019.
International Searching Authority, International Search Report and Written Opinion, dated Dec. 1, 2014, 15 pages.

* cited by examiner

TRIGGERING AN ACTION IN A COMPUTER DEVICE

CROSS-REFERENCE TO RELATED APPLICATIONS

The present application claims benefit of priority to Great Britain Patent Application No. 1316196.3, entitled "TRIGGERING AN ACTION IN A COMPUTER DEVICE" and filed on 11 Sep. 2013, which is specifically incorporated by reference herein for all that it discloses or teaches. The present application is further a National Stage entry from International Patent Application No. PCT/EP2014/069458, entitled "TRIGGERING AN ACTION IN A COMPUTER DEVICE" and filed on 11 Sep. 2014, which is also specifically incorporated by reference herein for all that it discloses or teaches.

FIELD

The present invention relates to triggering an action in a computer device.

BACKGROUND

This invention pertains primarily but not exclusively to the field of consuming content on a user device. The content can be consumed by viewing and/or listening.

There is an ever increasing amount of content which can be selected and viewed by a viewer on a viewing device, such as a television. There is an increasing number of television channels, and "on-demand" content included in television viewing packages. It is challenging for a viewer to find content which they would deem interesting to watch in a reasonable time frame due to the proliferation of content which is available for them to select from. Viewers may develop limited viewing habits where they choose only between a small number of content sources e.g. channels known to them, or waste time scrolling through page after page of electronic programming guide data, which may not quickly and adequately reveal information that may be of interest to a particular viewer.

SUMMARY

The present disclosure pertains to the possibility of providing recommendations to a user while a user is consuming content at a user device. A challenge addressed by the present disclosure is to provide recommendation data to a user (hereinafter referred to as a viewer, where it is understood this is a non-restrictive term meaning a user consuming visual and/or audio content) at the right moment so that the interruption is not only not intrusive, but actually is of genuine value to the viewer.

More generally, the challenge is to trigger an action (such as the transmission of recommendation data to a viewer) at an appropriate time.

This disclosure is not restricted to the transmission of recommendation data. Other actions which are envisaged include (but are not restricted to)
  display what friends are watching recently or right now
  post comments to social media
  display a list of recently watched on-demand assets which the user did not finish watching
  display a list of times and channels when the user's favourite shows will be on next and allow them to set reminders for them
  provide advertisements tailored to the user To achieve an optimised timing of such actions, the present disclosure provides a method of triggering an action for example, the transmission of data to a user device. According to the present invention, the method comprises receiving content change signals at a processor executing a content change detection algorithm, wherein the content change signals denote a change of content being consumed at a user device. The detection algorithm compares the content change signals with a content change behaviour associated with that device to detect a surfing condition, and generates a triggering control signal for triggering an action such as transmission of data to the user when the surfing condition for that device is detected.

The user device is referred to herein as a viewing device but it is understood that the term encompasses devices having a loudspeaker to deliver audio content.

The content can be from any appropriate content source. For example, the content can be delivered by a television channel from a television network, either through a broadcast medium or the internet. The content could be video assets such as films or news clips, advertisements or audio content such as songs.

In this context a "surfing condition" is intended to be a condition that a user is no longer watching one piece of content but is seeking another piece of content, for example by channel hopping using their channel controller.

The data can be recommendation data for possible content, such as but not restricted to viewing TV channels to be selected by a user. Other recommended content can be video assets, news clips, social medial feeds, songs, etc. The recommendation data can be provided by displaying options to a user at the viewing device. Many viewers possess additional user devices which they can use as a companion to the viewing of a main, viewing device such as a television. In such a case, the recommendation data can be transmitted to the companion device.

The user device can be arranged to display the recommendation data as viewing options which can be selected by a user.

The content change detection algorithm is interchangeably referred to here as a channel hop detection algorithm.

The viewing device or companion device can further be configured to display to a user an icon denoting activity of the channel hop detection algorithm.

In one embodiment, the method can provide the step of receiving user input at the processor executing the channel hop detection algorithm, the user input responding to the data transmitted to the user device. This allows feedback about the timing of delivery of the recommendations to a particular user to be collected so as to intelligently develop a channel hop behaviour for that viewing device.

Another aspect of the invention provides a computer device comprising: a processor operable to execute a content change detection algorithm and configured to receive content change signals which denote a change of content being consumed at a user device; wherein the channel hop detection algorithm is configured to compare the content change signals with a content change behaviour associated with that device to detect a surfing condition and to generate a triggering control signal for triggering an action when the surfing condition for that device is detected.

Another aspect of the invention provides a computer program product comprising computer instructions recorded on a non-transitional medium, the computer instructions controlling a processor to perform the following steps: receive content change signals, said content change signals denoting a change of content being consumed at a user device; compare the content change signals with a content change behaviour associated with that device to detect a surfing condition; and generate a triggering control signal for triggering an action when the surfing condition for that device is detected.

The content can be consumed at the user device by a user viewing the content or a user listening to the content. The content change behaviour associated with the user device can be recorded in a user profile of a user associated with that user device.

When the data is recommendation data for possible content to be selected by a user, the method can comprise monitoring content change signals of a user when consuming content which is being selected based on the recommendation data, feeding back detection of a surfing condition to a supplier of recommendation data and altering the recommendation data if a surfing condition is detected within a predetermined time of commencement of the content.

Detection of a surfing condition can be associated with the location in a piece of content being consumed at the user device, and that location can be recorded in association with the content and a user profile.

In an embodiment of the invention, multiple user profiles can be monitored, each of which records a location in a piece of content where surfing by the users was detected, and the monitoring can be used to provide an indication of the quality of the content.

Different users can have different content change behaviours recorded in their user profiles. In that case a surfing condition detected for a first user can have different characteristics to a surfing condition detected for a second user.

The content change behaviour may be modified based on feedback from a user engaging with the content.

In one embodiment, the method comprises detecting the start of piece of content being consumed at the user device, monitoring the content change signals and recording a content change behaviour based on monitoring the content change signals, and storing the content change behaviour in a user profile associated with the user.

The content change behaviour associated with the user can be used to control recommendation data delivered to the user.

The content change signals can be monitored while a user is viewing the content which has been surfaced to him based on his previous channel hop behaviour. The content can then be changed based on the monitoring of the content change signals. For example the content can be at least one partially viewed asset, information about availability of other content or advertisements.

According to another aspect of the invention, there is provided a computer implemented method of determining a user behaviour when consuming content for use in triggering an action related to the content, the method comprising: monitoring content change signals generated by a user consuming a piece of content in a first time frame; detecting a surfing condition by comparing the content change signals with a first content change behaviour associated with the user; triggering the display of at least one recommendation to the user based on the detection of the surfing condition; detecting whether and/or how a user engages with the recommendation and selectively modifying the content change behaviour based on the user engagement; storing a modified content change behaviour in a user profile associated with the user, the modified content change behaviour having a higher confidence ranking than the first content change behaviour; and using the modified content change behaviour to detect a surfing condition by monitoring content change signals in a second time frame.

Engagement by a user:
  whether a user ignores the recommendation
  whether a user views recommendation and commences channel hopping again
Recommendation:
  advertisements
  recommended piece of content
  recommended options to select This is an exemplification of a method of detecting and determining a user behaviour with increasing quality to be used afterwards. The method can be implemented by an app (computer application which can be downloaded to a user device and executed by a processor on the user device). The above method allows a user behaviour to be determined with increasing confidence so that a particular viewer's habits can be "learnt". The algorithm can use the viewer's habits to refine its accuracy over time.

Another aspect of the invention provides a computer implemented method of detecting a surfing condition when a user who is consuming content at a user device is seeking new content to consume, the method comprising; detecting successive content change signals generated by the user; for each content change signal, recording a time elapsed since the preceding content change signal; recording the number of content change signals with an elapsed time between them which is less than a certain value; and detecting a surfing condition when the number exceeds a qualifying frequency.

In one embodiment, the qualifying frequency is altered based on user behaviour when consuming content.

The qualifying frequency can be altered based on user behaviour when consuming content, to allow the optimal number of channel hops to be observed before triggering a custom action.

For a better understanding of the present invention and to show how the same may be carried into effect, reference will now be made by way of example, to the drawings.

DESCRIPTION OF EMBODIMENTS

Figure 1:
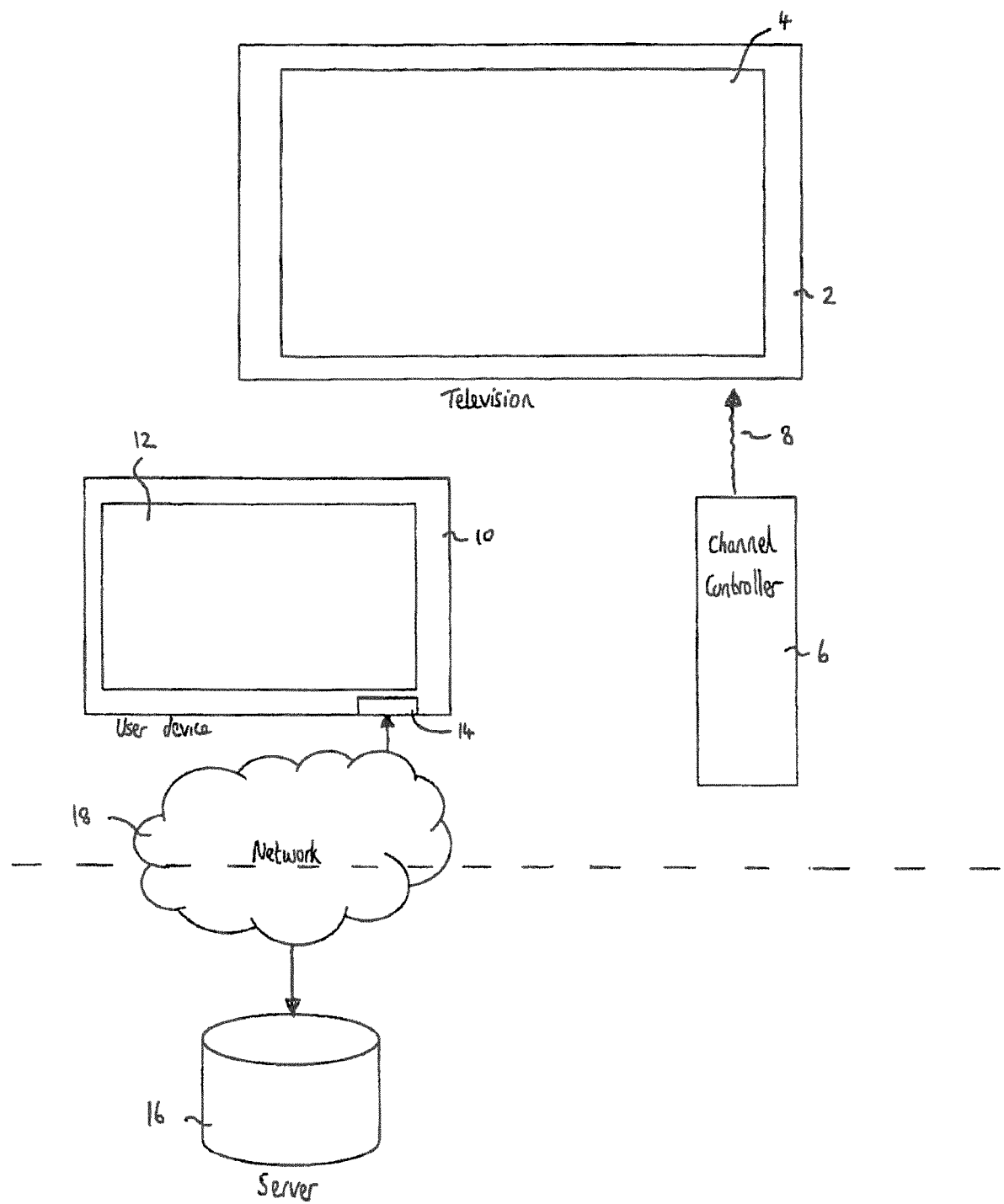
FIG. 1 is a schematic block diagram of a component for use in a method of providing viewing recommendation data to a user.

A method of controlling transmission of recommendation data to a user device will now be described with reference to FIG. 1. FIG. 1 shows three devices which can be provided for a user in a particular location. As will become clear from the following alternative embodiments can be implemented using only one or two devices. FIG. 1 illustrates a viewing device such as a television 2 with a screen 4. A channel controller 6 is provided for a user to control the television 2 so that the particular channel selected for viewing on the screen 4 is under the control of the user through the channel controller 6. The channel controller 6 can operate using infrared channel control signals 8. A user also has a companion user device 10. This user device can take the form of any kind of computer device including but not limited to tablets, mobile phones, smartphones, laptops, etc. In particular, the user device 10 has a screen 12 for displaying data to a user. The user device 10 also has a network connection 14 to allow it to communicate with a server 16 via a network 18. The network connection can be wired such as Ethernet or wireless (either WiFi or GSM), or any suitable interface which allows the user device 10 to communicate with the server 16. The dotted line in FIG. 1 denotes the fact that the channel controller 6, user device 10 and television 2 are likely to be in the same physical location, such as a room, while the server 16 is likely to be in a remote location.

The user device 10 includes a processor which executes a channel change detection algorithm when a viewer is "channel hopping" or "surfing". The aim of the channel hop detection algorithm is to determine when a viewer is looking for something to watch so as to detect this behaviour and make some suggestions to them about what they may want to watch. The suggestions can be supplied in the form of recommendation data which is displayed to a user on the screen 12.

The inputs to the channel hop detection algorithm are channel change events. When the channel hop detection algorithm detects that the channel change pattern matches a typical channel hop behaviour, the output from the algorithm takes the form of a data transmission control signal which is used to trigger the surfacing of recommendation data suitable for the viewer. The channel change events can be supplied to the channel hop detection algorithm in any suitable manner. For example, the user device can be capable of audio content recognition (ACR), or it can receive signals directly from the television 2 or channel controller 6. It will readily be appreciated that in this context, the television 2 encompasses any kind of viewing device, and in particular, encompasses a set top box associated with a screen. In that case, signals could come directly from the set top box.

According to FIG. 1, three separate devices are discussed: a viewing device (such as a television), a companion device (such as a smartphone) and a channel controller. However, in alternative embodiments, the functions of these three devices can be combined into one or two devices. For example, the user device 10 can be configured to act as the channel controller, rendering a separate channel controller device 6 redundant. In such a case, when recommendations are surfaced on the user device, a particular recommendation could be selected by a user by tapping on the displayed recommendation from the options presented to cause the viewing device to change to that channel immediately.

Furthermore, the user device 10 could be the viewing device itself. That is, the television would not be needed and the user device could act as the viewing device on which a user views content. Recommendation data could be surfaced to a user in a part of the screen 12 which is not used for viewing content, or intermittently with viewed content. However it is presented, it is preferable that it does not interrupt the viewing experience of a user, however. In split screen applications, the recommendation data could be surfaced on a part of the screen which is not used for viewing content. Once again, a user could select a particular recommendation option by tapping on that option which would cause the viewing content in the viewing display to immediately change to the selected option.

Fewer presentations of recommendations when the app is surer about the situation are more valuable to a user than more presentations when the app is only partly sure of the user's behaviour. Nevertheless, in all cases the supply of recommendation data as triggered by the app is preferable to supplying recommendation data which has no relationship to the channel change behaviour. This is achieved by comparing the current channel change event activity with a behaviour for that viewer. To this end, the algorithm 104 uses feedback based on the user actions responsive to the recommendation data to "learn" the viewer's habits. The algorithm uses the viewers' habits to refine its accuracy over time. It is possible for it to begin with a so-called "cold start", that is, without any initial data, or with a sample profile chosen by the system from a stock of existing profiles, as described in more detail below, or from a fixed starting point which is then refined over time.

Feedback from the user concerning the recommendation data can include understanding which recommendation options (such as 304, 306 in FIG. 3) have been displayed and which of those options have been ignored or selected. If recommendation options are ignored, it can be assumed that this was not a good point in time to trigger the surfacing of recommendation data to a user. If they are selected, this conversely will indicate that that particular channel change behaviour represented a good trigger point for surfacing recommendation data.

In the following description, an example user device is described which is in the context of FIG. 1—that is, it carries out the function of the user device 10 as described in FIG. 1. It will be appreciated that when the user device additionally acts as the channel controller and/or viewing device, components supplying these functions will be present in the user device.

Figure 2:
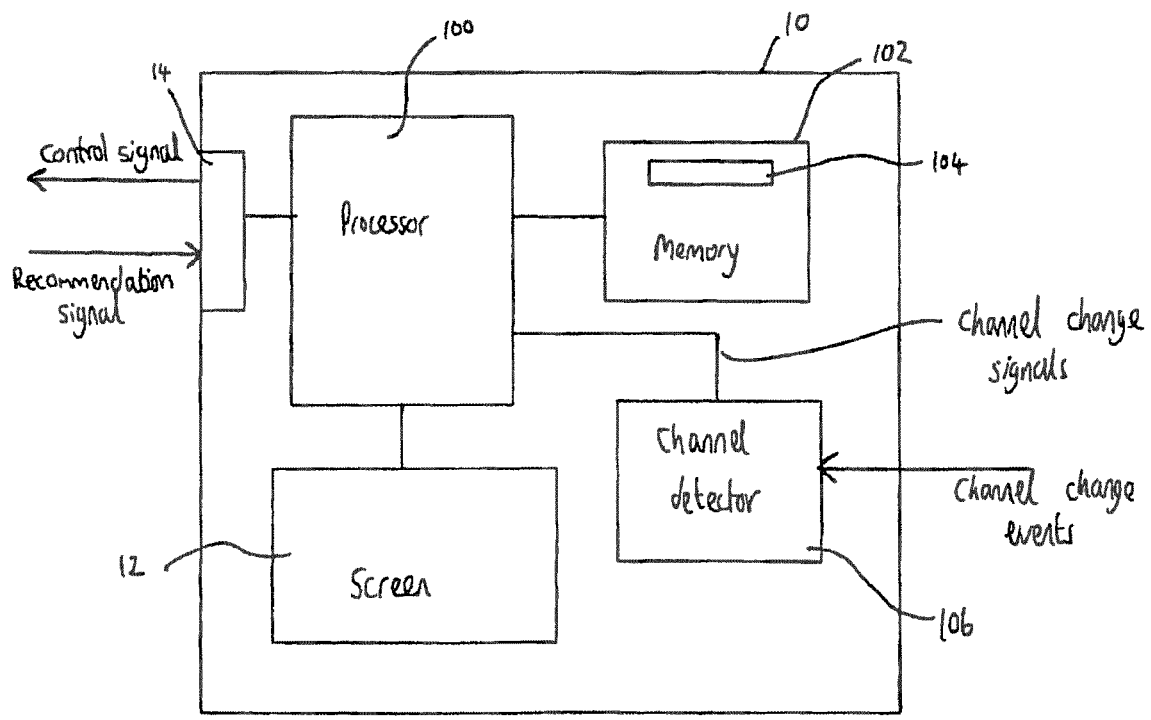
FIG. 2 is a schematic block diagram of a user device.

FIG. 2 is a schematic block diagram of a user device 10. The user device comprises a processor 100 which is connected to a memory 102. The memory holds code for execution by the processor and includes applications which can be executed by the processor 100. In this case, the applications, (apps) include a channel hop detection app which incorporates the channel hop detection algorithm 104. The processor 100 is connected to the network interface 14, to the screen 12 and to a channel change event detector 106. The channel change event detector 106 detects channel change events and supplies channel change signals to the processor 100. When the processor 100 is executing the channel hop detection algorithm 104, the channel change signals are utilised by the algorithm 104 to determine current viewer behaviour.

A processor 100 is also connected to the screen 12 to allow it to display recommendation data when such recommendation data is received from the server 16. The recommendation data is received by the device 10 in response to despatch of a control signal which is generated by the channel hop detection algorithm when the detected channel change pattern (based on the channel change signals) matches a typical channel hop behaviour for that viewer.

Figure 3:
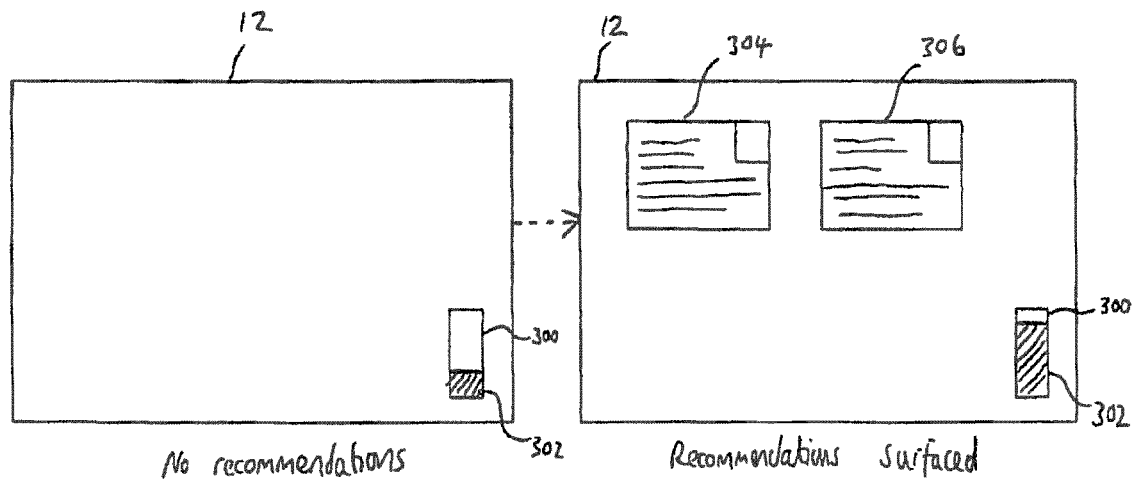
FIG. 3 is a sketch showing the display of recommendation options to a user.

FIG. 3 illustrates what might be displayed on the screen 12 to a user as the channel hop detection algorithm operates. An icon 300 denotes the activity of the channel hop behaviour detection algorithm. The icon takes the form of a bar, with a moving "level" 302 which denotes the number of channel changes defined as channel hops. The level thus indicates to a user how close they are to receiving a recommendation. When a typical channel hop behaviour is detected which denotes a normal surfing condition for the viewer (after a further time denoted by the level 302 on the screen in the right-hand side of FIG. 3), recommendation data which has been received from the server 16 is displayed on the screen 12. For example, this recommendation data takes the form of two particular viewing recommendation options 304, 306, each comprising an image and text representing a particular program which can presently be viewed by a user.

The channel hop behaviour itself, can form part of useful analytical information to be dispatched to the server 16. The feedback from the user related to whether or not they are really in a "surfing condition" (channel hopping mode) helps to adjust the trigger point (point of detection) more and more precisely individualized for the user's benefit. This is one advantage of allowing user feedback to be taken into account by the app. Additionally, this kind of feedback is useful to gather more personalized information about the analysis of channel hopping itself.

The precise manner in which the server 16 selects recommendation data for supply to the user device 10 is outside the scope of the present application. What is important is the time at which the recommendation data is triggered to be transmitted from the server 16 to the user device 10. However, the channel hopping behaviour in itself can form a useful piece of analytic information to assist in selecting recommendation options to be dispatched from the server 16. The server 16 comprises a processor which executes an application which takes an input the identity of the user and the triggering time for that user to allow it to present recommendation data based on that triggering time for the user. It will be appreciated that the server 16 is likely to be monitoring the triggering time of several user devices and therefore it needs to associate the appropriate triggering time with the identity of a particular user. Channel hop behaviour can be user specific or device specific. That is, behaviours for comparison in the algorithm can be associated with a user identifier or a device identifier (or both). This allows different users to log in to the same device and still have tailored trigger timings. In addition, this application can take into account channel hopping behaviour analytics in order to provide particular recommendation options.

While the information about the triggering time as detected by the channel hopping behaviour is supplied from the user device 10 to the server 16 in real time so that recommendation data is surfaced appropriately, analytical data concerning the viewing behaviour can be "lazily" supplied as there is no real time requirement for this data. In the meantime, such analytical data can be held at the memory 102 of the user device 10.

Figure 4:
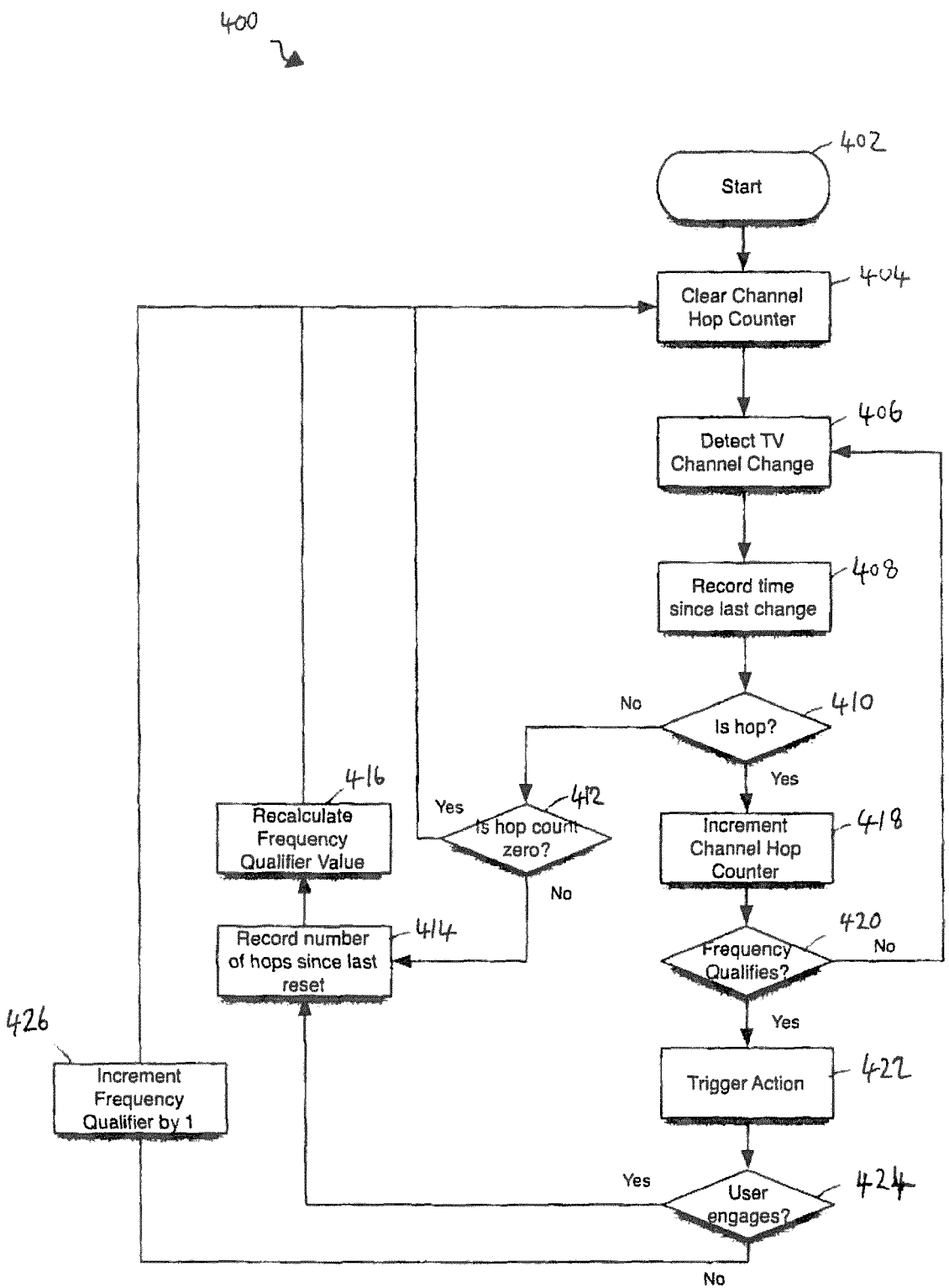
FIG. 4 is a flow chart illustrating operation of the channel hop detection algorithm.

FIG. 4 is a flow diagram 400 illustrating the main process steps performed by the channel hop detection app 104.

The channel hop detection app is launched on the user device 10 at step S402 ("start").

After the channel hop detection app is launched on the user device 10, the process proceeds to step S404 (clear channel hop counter) by 'zeroing' or resetting a channel hop counter 103. The channel hop counter keeps track of how many times the viewer of television 2 has channel hopped. A channel hop is defined as the act of changing from one channel to another channel shortly after a previous channel change. Precisely how a channel change is determined to be a channel hop is explained later with respect to FIGS. 5 to 7.

During normal operation of the channel hop detection app, the user device 10 may constantly attempt to detect a TV programme currently being watched using Audio Content Recognition (ACR). A feature of ACR is that it also provides information about the current TV channel periodically, even if the channel has not changed. At Step S406 (detect TV channel change), the channel hop detection app detects when the current TV channel is changed. The user device may detect the change in TV channel, for example by means of ACR, or alternatively the user device 10 may receive data with details of channel changes directly from the television 2 or a set top box associated with television 2, or the channel controller itself.

At step 408 (record time since last change) the channel hop detection app calculates how long it is since the previous channel change and records this value in the memory 102 at the user device 10. This metric is important to channel hop detection logic utilised by the channel hop detection algorithm 104, and all calculated values of time elapsed since a previous channel change are recorded. Statistical analysis is performed during step S408 in order to help determine whether a channel change qualifies as a channel hop (as determined in the following step, S410). This statistical analysis is further explained below with reference to FIGS. 5 and 6.

At step S410, the channel hop detection app assesses whether or not the channel change detected at step S406 qualifies as a channel hop. Again, precisely how a channel change is determined to be a qualifying channel hop is explained later with reference to FIGS. 5 to 7.

If it is determined at step S410 that the detected channel change does qualify as a channel hop, then the channel hop counter 103 is incremented by one (step S418) to keep track of the number of channel hops that have occurred since the start of the process.

At step S420 ("Frequency Qualifies?") a Frequency Qualifier threshold value is used to determine whether enough consecutive channel hops have occurred to trigger retrieval and displaying of viewing recommendation data at the user device 10. If it is determined that there are not enough channel hops, then the procedure returns to step S406 (detect TV channel change). If it is determined that there are enough channel hops, then the process proceeds to step S422. This part of the process is explained in more detail with reference to the frequency qualification, below.

At step S422 (trigger action), the channel hop detection app performs what is termed a "custom action". Other custom actions are discussed later. The custom action in this exemplifying scenario is that the user device 10 contacts the server 16 to retrieve viewing recommendation data from the server 16 that can be received and displayed at the screen 12 of user device. During this particular instance of step S422 in the described process, no further detected channel changes or channel hops will cause any further action to be taken.

At step S424 it is determined whether or not the user of user device 10 engages with any of the one or more viewing recommendation(s) presented to him.

If the user of user device 10 does engage with a viewing recommendation at step S424, that is the user actively interacts with the viewing recommendation in such a way that it can be said the user of user device 10 and television 2 has successfully found something to watch, then the process moves on to step S414 where the app records in the memory 102 how many channel hops have happened since the previous reset back at step S404. Once the number of hops have been recorded at step S414, the Frequency Qualifier value is recalculated (step S416) which is explained in more detail below. The channel hop counter 103 is then reset at step S404 and the process starts again from step S406 (detect TV channel change) as described above. In this way, the channel hop counter 103 retains a measure of consecutive channel hops.

On the other hand, it may be determined at step S424 that the user of user device 10 does not respond positively to the custom action (i.e. by not selecting one of the at least one viewing recommendation(s)). A user may not respond positively to the viewing recommendation for one or more of reasons, including but not limited to: viewing recommendations being retrieved and displayed too often; none of the choices offered are relevant to the user; the user ignores the viewing recommendations and may decide to do something else rather than interacting with the user device 10. Note that when there is no positive response to the viewing recommendation at step S424 there is no need to record the number of channel hops at the channel hop counter 103 as per step S414 above, because the user did not successfully find anything to watch from the viewing recommendation(s). Instead, when it is determined that there is no positive response (in other words there is a negative response) from user at step S424, the process moves to step S426. At step S426, the channel hop detection algorithm increments the Frequency Qualifier value by one before the process returns to step S404 where the channel hop counter 103 is reset and the process starts again from step S406 (detect TV channel change) as described above. This new increased value of the Frequency Qualifier value will now continue to be used at decision step S420 ("Frequency Qualifies?") unless one of the following occurs: i) the Frequency Qualifier value is subsequently further incremented by one because the user does not respond positively to a viewing recommendation at step S424; or ii) the user successfully finds something to watch after a period of channel hops, in which case the number of channel hops is recorded (S414) and the Frequency Qualifier value is recalculated at (S416), as explained below.

As explained above channel hop detection process may determine that a user has successfully found something to watch when the user positively responds to a viewing recommendation at step S424. Alternatively the channel hop detection process may determine that the user has successfully found something to watch by themselves because a channel change took place long enough after one or more channel hops. This suggests that the user changed the channel by themselves (that is, without engaging with a viewing recommendation) and has left the television 2 tuned to that channel for a period of time. The channel hop detection process determines that the user has found something to watch by themselves from decision step S410 ("Is hop?"). If it is determined at step S410 that the previous channel change is not a hop then the process moves to step S412 where it is determined whether the channel hop counter 103 has a value of zero (i.e. no channel hops), or a value greater than zero (i.e. one or more channel hops have occurred since the counter was reset set step S404). If S412 determines that the channel hop count is zero the process returns to step S404 and starts again. If step S412 determines that the channel hop count is greater than zero then the number of hops since the last reset (at step S404) are recorded in memory 102 at step S414. In this case, there has been one or more channel hops followed by a non-channel hop; that is, there has been a period of uncertainty as to what channel the user wants to watch followed by a period where the channel has not changed for some time.

Therefore the channel hop data recorded at step S414 describes the user's history of successfully finding something to watch, either by themselves or through a positive response to the custom action (e.g. viewing recommendation).

The best time to present the user with viewing recommendations via the custom action is therefore the rounded-down average number of channel hops taken to successfully find something to watch. When there is fewer than 25 such recorded channel hops recorded, the simple average is used. However, when there are more than 25 channel hops it is the rounded-down average of the last 25 channel hops recorded to memory 102 that is calculated. Using a moving average in this way will smooth out any short-term fluctuations in the trend but still provides for the user's viewing habits that may change naturally over time. Thus the number of recorded channel hops from step S414 is used to recalculate (update) the Frequency Qualifier value at step S416. The updated Frequency Qualifier value is then used by the channel hop detection process at step S420 until the value is either subsequently updated again at step S416 or is incremented by one when the user does not respond positively to the custom action at step S424 (as described above). After the Frequency Qualifier value has been updated at step S416 the process returns to step S404 where the channel hop counter is reset and the process starts again as previously described.

There are many cases where people change channel when they are not "channel hopping". Such occurrences would, without excluding zero counts add too many zero counts to the data being recorded at step S414 and skew the averages. Therefore according to the channel hop detection process 400, a simple channel change does not automatically give rise to the recalculation of the Frequency Qualifier value at step S416. In one example, a user may watch 30 minutes of one channel followed by a channel change and then watch the new channel for 20 minutes. In this case because no channel hop has occurred, the channel hop count is zero (S412), and thus no channel hops are recorded (S414) and the Frequency Qualifier value recalculation step (S416) is not reached. This is a desirable outcome as isolated or infrequent channel changes should not reset any temporary increments to the Frequency Qualifier value that have arisen as a result of the user not responding positively to the custom action (viewing recommendation(s)) at step S424.

Back-to-back consecutive negative responses by the user to the custom action (viewing recommendation(s)) would continue to increase the Frequency Qualifier value by one. This gives the channel hop detection algorithm time to adapt to a better overall Frequency Qualifier value for the user.

The increments by one to the Frequency Qualifier value resulting from negative responses to the custom action (e.g. viewing recommendations(s)) do not affect the channel hop data recorded at step S414 from which the moving average is calculated. The incremented Frequency Qualifier value simply means the Qualifying frequency value is temporarily increased such that the channel hop detection algorithm will only trigger the custom action (S422) if the increased threshold of channel hops is met. This way the viewing recommendations will temporarily be presented to the user less often thus reducing the risk of interrupting or bothering the user.

Figure 5:
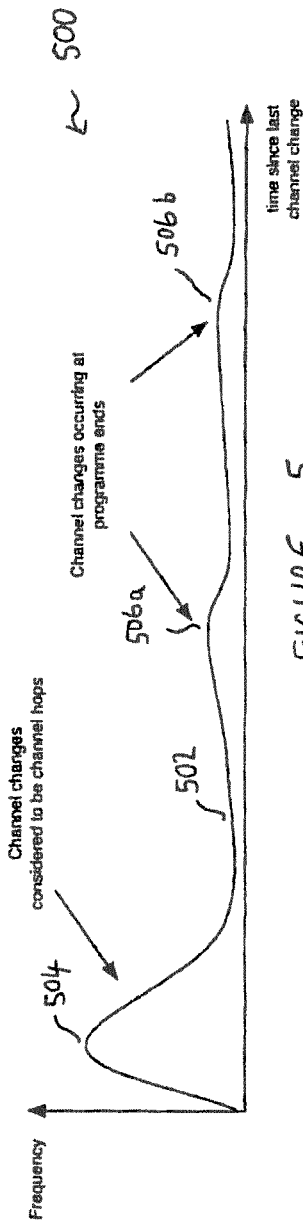
FIG. 5 is a graph showing channel hop behaviour.

Referring now to FIG. 5, the graph 500 is an example graphical representation of the channel changes and channel hops. The graph 500 illustrates typical times between channel changes for a user of television 2. The horizontal axis shows the time since the previous channel change, while the vertical axis shows the number of channel changes recorded for the user over discrete periods of time (frequency of channel changes). The curve 502 shown on graph 500 is a smoothed line representing an example data set which we will examine in further detail now.

The curve 502 on graph 500 shows a first peak that is roughly a bell-curve 504. This bell-curve 504 shows that there was a high frequency of channel changes which are likely to qualify as channel hops. That is because a relatively large number of channel changes have occurred quickly after another channel change. For this reason curve 504 may be referred to as channel hop curve 504.

The curve 502 also shows two subsequent minor peaks 506a and 506b. Minor peaks 506a and 506b represent channel changes that occur around the time of the end for television programmes of a popular length e.g. thirty minutes or one hour. For instance the channel changes represented by peaks 506a and 506b reflect the channel changes that might normally be performed by the user of television 2 at the end of a television programme when they are looking to watch something else on a different channel.

As can be seen in FIG. 5, peaks 506a and 506b are significantly smaller than channel hop curve 504 because television programmes have a significant duration spread. Moreover, a user will not always watch a television programme from when that programme actually started and may switch channel to begin watching a programme at any time. As such there is always some level of background channel changes at every point along the horizontal axis, as represented by the non-peak sections of curve 502.

Thus there may be some small grouping of channel changes around the end of television programmes of a popular length (i.e. peaks 506a and 506b) but in this example, the frequency of channel changes at these minor peaks do not qualify as channel hops. Any channel changes that are not channel hops may be eliminated (filtered) by the channel hop detection app performing statistical analysis as described now in relation to FIG. 6.

Figure 6:
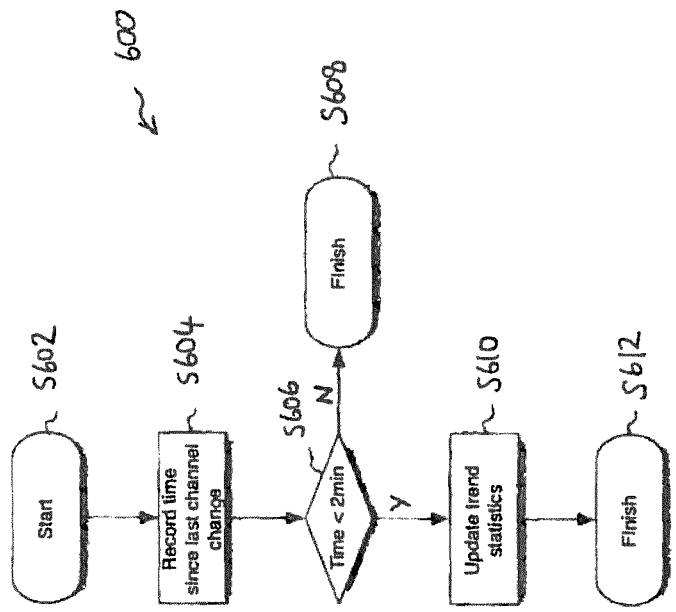
FIG. 6 is a flow chart showing the channel hop behaviour analytics.

FIG. 6 is a flow diagram 600 that illustrates the process of statistical analysis employed by the channel hop detection app during S408 (record time since last change) as described above in relation to FIG. 4, above.

The statistical analysis process starts at S602 (start). The process moves on to S604 where the time value since the previous channel change is recorded in the memory 102 at the user device 10. Note that step S604 is essentially the same as step S408 in FIG. 4.

The statistical analysis process then continues to step S606 where any channel change that happens more than a certain time period, e.g. two minutes, after the previous channel change is filtered and removed. Therefore most of the channel changes, as represented by the data points that do not form the channel hop curve 504 as shown in graph 500, are filtered and the statistical analysis process finishes for these channel changes (at step S608).

For channel changes that happen within the time period, e.g. two minutes, of the previous channel change at step S606, the process moves to step S610. These remaining channel changes (i.e. those channel changes not eliminated at S606) are checked at S610 (update trend statistics) are compiled to see if they form an approximately bell-shaped distribution. Further, at S610 the standard deviation of the remaining channel changes, together with the time at which the peak 504 occurs is determined. Thus the channel changes have been filtered and analysed. This analysis can be static or adaptive analysis.

Figure 7:
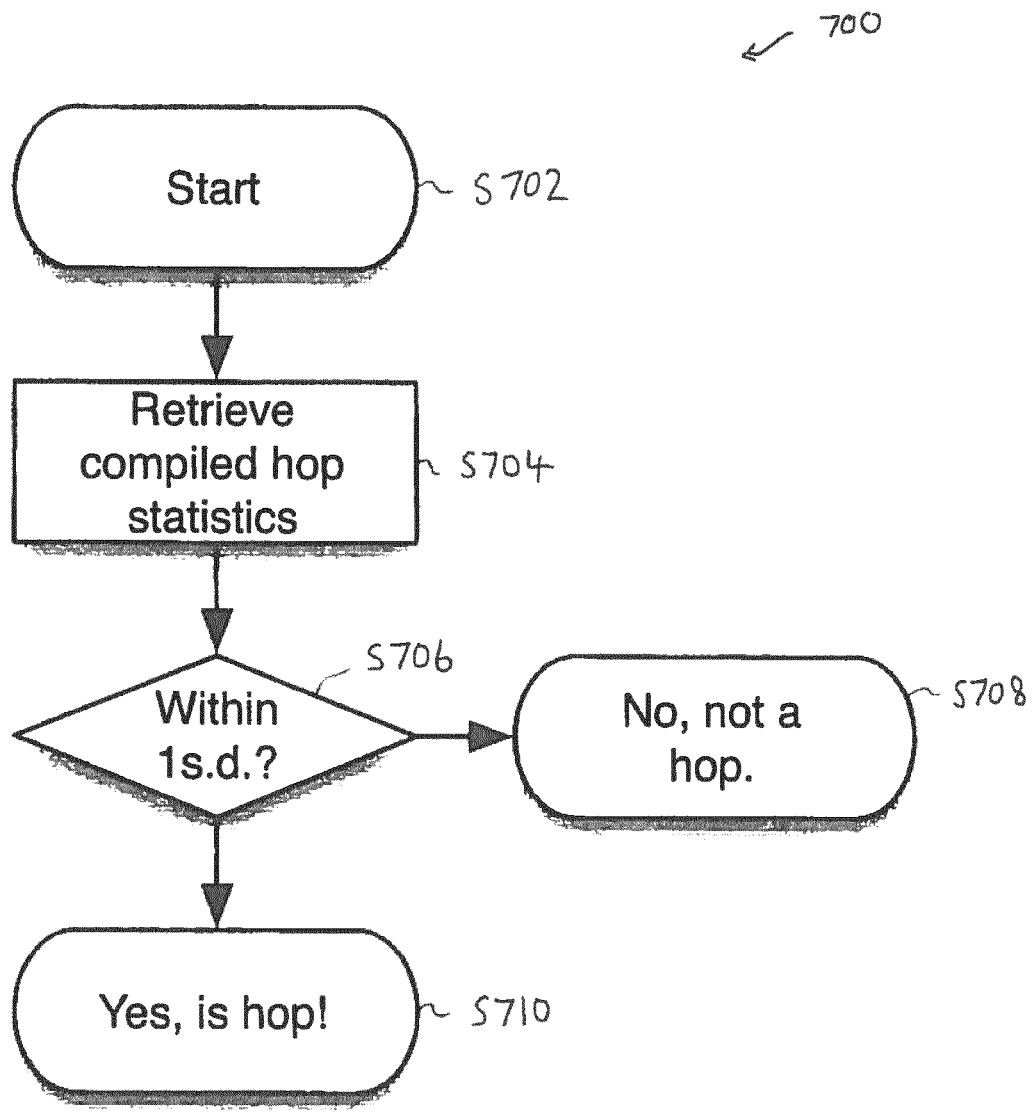
FIG. 7 is a flow chart showing a channel hop logic process.

Once the channel changes have been filtered and analysed according to the statistical analysis process in 600, the channel hop detection logic is utilised to confirm whether the channel changes compiled in S610 are actually channel hops. Reference is made to FIG. 7 to illustrate the channel hop logic process.

The channel hop logic process starts at step S702 (start). The process moves to step S704 where the compiled change statistics are retrieved. At step S706 the hop logic process checks to determine that any channel change is within one standard deviation of the peak of the channel hop curve 504. If the channel changes are within the one standard deviation, the process confirms that the channel change is indeed a channel hop (S710). If the channel change is outside of the one standard deviation of channel hop curve 504, then the channel change is determined to be merely a channel change and not a channel hop (S708). These remaining channel changes may be filtered so that only channel hops are considered in the remaining process steps of FIG. 400, i.e. from steps S410 onwards.

Referring back to step S420 of the channel hop detection app, the qualifying frequency that stipulates how many channel hops is enough to trigger the user device 10 to retrieve viewing recommendation data from server 16 must first be determined so that the trigger action at S422 is correctly activated and only when the qualifying frequency is met.

Because the qualifying frequency is determined at S416 from recording the channel hop count (S414) just before each time the counter is reset (S404) or when the Frequency Qualifier value is incremented by one when there is a negative response to the viewing recommendation(s), the optimal number of channel hops to observe before triggering the custom action (i.e. retrieval and display of viewing recommendations) can be determined by the channel hop detection app.

For example, if the average number of channel hops is less than the determined frequency qualification value, then the frequency qualification value is reduced by the channel hop detection app until the trigger action at step S422 is activated (such that viewing recommendations are retrieved and displayed at the user device 10).

On the other hand, if viewing recommendations are being shown too often with the user not engaging with them (dismissing or ignoring the recommendations displayed at the user device), then the frequency qualification value needs to be increased.

According to the above example, the action which is triggered at an appropriate time based on the content change detection algorithm is to transmit recommendation data which currently displays viewing options to a user. However, the disclosure is not restricted in this respect. Other custom actions are possible and include the following.

In a case where the user device 10 is connected to the network, and wherein other user devices are also connected to the network showing content viewed by other users, the custom action can display to the present user what the other users are watching recently or right now. In a case where the user device is running a client programme which allows "friends" to be identified, the viewing content being watched by these friends can be displayed to a user at a present user device. In the context of social media, the concept of "friends" is known and is not discussed further herein.

An alternative custom action is to post comments to a social media website. This can be achieved by presenting a portal to a user at the triggered time, the portal associated with a social media website, for a user to post comments. In one possible implementation, comments could be created by the app, for example "I don't know what to watch, any ideas?" which could be transmitted as a message to a user's friends.

A further custom action is to display a list of recently watched on demand assets which the user did not finish watching. To achieve this, when a user commences watching a piece of content (asset) this can be recorded locally at the user device or at the server and when the user ceases to watch the content this can be flagged for later retrieval at the trigger time.

A further custom action is to present information about available content tailored to a user, for example by listing times and channels when a user's favourite shows will be on next and allow them to set reminders for them.

A further custom action is to display to the user advertisements, for example ads which are tailored to the user.

The example given in the description above has focused on the context of television, where viewing content is provided by television channels. The disclosure is not restricted in this respect. Other content sources can be selected by a user and changes in content monitored with the same effect. For example, embodiments extend to cover "zapping behaviour" on video content which might be supplied with for example, via the internet or by any other appropriate content first.

The following alternative and additional embodiments are also envisaged. A combination of any of the following features with any of the features earlier presented is also envisaged as being within the scope of the present invention.

The channel hopping behaviour of an individual user can be stored as part of the user profile. Different users may behave differently, and therefore what is identified as a surfing condition for one user, may not be a surfing condition for another user. Based on analysis of a users behaviour when a user engages with the user interface, and using feedback based on a users engagement with content, an appropriate behaviour for that user can be determined and stored. When a surfing condition is detected, it can be used to place adverts at different locations in a piece of content, based on a location at which a surfing condition is detected. Moreover, by monitoring the users channel hopping behaviour, the ads which are delivered can be improved. If a person has a trend for channel hopping in ad breaks, the ads can be changed to reduce the amount of channel hopping, as detected by feedback.

The detection of channel hopping after the beginning of a show can be an indication of negative feedback, and this can be used to drive further content recommendations for the user.

The channel hop behaviour of a user can be learnt. When a user is viewing content, the channel hop behaviour is monitored and for example it could be noted that there is always a channel hop behaviour after a certain period of time (for example 15 minutes) in certain pieces of content. This can be recorded in the user behaviour for that user in his user profile, and this information can be used to improve subsequent recommendations.

Multiple user profiles can be monitored so that for example if channel hopping was detected by a large number of users in a specific movie, a content provider would be interested in this.

As different users have different inherent channel changing behaviour, the detection of a surfing condition to infer boredom of a particular user may differ from user to user.

The detection algorithm described herein determines amongst other things a period of time before which it is determined that there is a channel hop (as opposed to a legitimate channel change). The algorithm can receive input from multiple users to determine average channel hop behaviour across a corpus of people and use that to drive alterations to the parameters in the algorithm, such as how long before a channel change constitutes the channel hop, and how many channel hops would constitute a surfing condition.

Other types of content that can be recommended include news feeds and social feeds.

In additional to linear channel content, the invention is also applicable to pre-stored assets available on demand (vod), where a channel hop condition could be inferred when a user is moving from one displayed piece of content to another displayed piece of content when seeking a selection of content.

The invention is applicable also in the context of assets which are solely audio without video. For example, it could be used to monitor the behaviour of a user who is looking for a particular song by changing between song titles in a list. Information about always switching from one album to another at a certain track in an album can also be of interest.

The invention claimed is:

1. A computer-implemented method of triggering an action based on behaviour of a user consuming content at a user device, the method comprising:
   receiving content change signals representing changes of a channel at a processor executing a content change detection algorithm, wherein the content change signals denote a change of content on the user device,
   calculating for each content change signal an elapsed time since a previous received content change signal; and
   assessing, based on the calculated elapsed time, whether each content change signal is associated with a channel hop,
   responsive to determining the change in channel is a channel hop:
      incrementing a channel change count;
      comparing the channel change count with a predetermined threshold associated with that device to detect whether the channel change count exceeds or meets the predetermined threshold;
      responsive to the channel change count meeting or exceeding the predetermined threshold:
         generating a triggering control signal for triggering an action;
         selectively modifying the predetermined threshold in response to the triggering control signal based on the channel change count; and
         resetting the channel change count to zero; and
      responsive to the channel change count not meeting or exceeding the predetermined threshold:
         maintaining the predetermined threshold; and
   responsive to determining the change in channel is not a channel hop:
      selectively modifying the threshold based on the channel change count; and
      resetting the channel change count to zero.

2. A method according to claim 1, wherein the action is transmission of data to be displayed to the user, the method further comprising the step of receiving a user input from the user at the processor executing the detection algorithm, wherein the user input is responsive to the data and wherein the user input is analyzed by the detection algorithm to determine the threshold with which the number of channel changes are compared.

3. A method according to claim 1, wherein the content change signals are detected using audio content recognition for recognising audio signals from content viewed on the user device.

4. A method according to claim 1, wherein the user device is connected by a network to at least one other device, and wherein the action is at least one of:
  displaying what is being viewed at the at least one other device; and
  displaying a social media portal for entering comments to be transmitted to the at least one other device.

5. A method according to claim 1, wherein the action is at least one of:
  displaying at least one partially viewed asset which the user had not viewed in its entirety;
  displaying information about availability of content tailored to the user; and
  displaying advertisements tailored to the user.

6. A method according to claim 2, wherein prior to the step of receiving the user input, the detection algorithm operates based on at least one of:
  no initial data;
  a sample profile; and
  a fixed starting point.

7. A method according to claim 1, wherein the threshold associated with the user device is recorded in a user profile of a user associated with that user device.

8. A method according to claim 1, wherein the action is transmission of recommendation data to be displayed to the user, the method further comprising monitoring the content change signals of the user when consuming content which has been selected based on the recommendation data, feeding back detection of a channel hop to a supplier of the recommendation data and altering the recommendation data if a channel hop is detected within a predetermined time of commencement of the content.

9. A method according to claim 1, further comprising associating detection of a channel hop with a location in a piece of content being consumed at the user device, and recording that location in association with the content in a user profile.

10. A method according to claim 1, further comprising monitoring multiple user profiles, each of which records a location in a piece of content where surfing by the users was detected, and using said monitoring to provide an indication of the quality of the content.

11. A method according to claim 1, wherein the threshold is recorded in a first user profile for the user, and a second threshold is recorded in a second user profile associated with a second user, wherein the channel hop detected for the first user differs from a channel hop detected for the second user.

12. A method according to claim 1, further comprising:
  detecting a start of a piece of content being consumed at the user device;
  monitoring the content change signals and recording a content change behaviour based on monitoring the content change signals; and
  storing the content change behaviour in a user profile associated with the user, wherein the content change behaviour associated with the user is used to control recommendation data delivered to the user.

13. A computer device comprising:
  a processor operable to execute a content change detection algorithm and configured to receive content change signals representing changes of channel which denote a change of content on a user device; the processor further configured to:
  calculate for each content change signal an elapsed time since a previous received content change signal; and
  assess, based on the calculated elapsed time, whether each content change signal is associated with a channel hop,
  responsive to the change in channel being a channel hop:
    increment a channel change count;
    compare the channel change count with a predetermined threshold associated with the device to detect whether the channel change count exceeds or meets the predetermined threshold;
    responsive to the channel change count meeting of exceeding the predetermined threshold:
      generate a triggering control signal for triggering an action;
      selectively modify the predetermined threshold in response to the trigger control signal based on the channel change count; and
      reset the channel change count to zero, and
    responsive to the channel change count not meeting or exceeding the predetermined threshold:
    maintaining the predetermined threshold,
  responsive to the change in channel not being a channel hop:
    selectively modify the predetermined threshold based on the channel change count; and
    reset the channel change count to zero.

14. A computer implemented method of detecting a surfing condition when a user who is consuming content at a user device is seeking new content to consume, the method comprising;
  detecting successive content change signals, representing changes of channel, generated by the user;
  for each content change signal, recording a time elapsed since the preceding content change signal;
  if an elapsed time between a current content change signal and a preceding content change signal is less than a certain value:
    incrementing a channel change count;
    detecting a surfing condition when the channel change count meets or exceeds a predetermined qualifying frequency; and
    responsive to meeting or exceeding the predetermined qualifying frequency:
      generating a triggering control signal for triggering an action;
      selectively modifying the predetermined qualifying frequency in response to the trigger control signal based on the channel change count; and
      resetting the channel change count to zero, and
    responsive to not meeting or exceeding the predetermined qualifying frequency:
      maintain the predetermined qualifying frequency, and
  if an elapsed time between a current content change signal and a preceding content change signal is more than a certain value:
    selectively modifying the qualifying frequency based on the channel change count; and
    resetting the channel change count to zero.

15. A method according to claim 14 wherein the qualifying frequency is altered based on user behaviour when consuming content.

16. A method according to claim 1 wherein the content change signal is associated with a channel hop if the elapsed time is less than a timing threshold.

17. A method according to claim 1 wherein responsive to determining the change in channel is not a channel hop, recalculating the threshold if the channel change count is non-zero.

18. A method according to claim 1 wherein if the triggering control signal is generated, the method further comprises detecting engagement of the user, wherein if engagement of the user is not detected the value of the threshold is incremented.

19. A method according to claim 1 wherein responsive to determining the channel change is not a channel hop, not modifying the threshold if the channel change count is zero.

20. A method according to claim 1
  wherein if the triggering control signal is generated, the method further comprises detecting engagement of the user, wherein if engagement of the user is detected then the threshold is modified.

* * * * *